UNITED STATES PATENT OFFICE.

GEORGE S. WOLFF, OF PHILADELPHIA, PENNSYLVANIA.

IMPROVEMENT IN LEATHER-STAINING COMPOUNDS.

Specification forming part of Letters Patent No. 190,660, dated May 8, 1877; application filed July 22, 1876.

*To all whom it may concern:*

Be it known that I, GEORGE S. WOLFF, of Philadelphia, in the county of Philadelphia and State of Pennsylvania, have invented a new and valuable Improvement in Black Stains; and I do hereby declare that the following is a full, clear, and exact description of the same.

This invention has relation to improvements in means for staining leather of a black color.

The object of the invention is to produce a liquid compound which, being applied to the surface of leather, will impart thereto a deep black color, and, by penetrating into the body of the same, will be incapable of rubbing off.

To this end the nature of the invention consists in the compound formed by mixing the materials hereinafter mentioned, in or about the proportions set forth.

I take 0.94 parts of blue aniline, 0.26 parts of yellow aniline, 0.48 parts of naphthaline, and 0.32 parts of red aniline, which are dissolved in seventy-four parts of alcohol in a suitable vessel by agitation. After being dissolved the liquid resulting is passed through a filter. This liquid, when applied to the surface of leather, will leave an indelible black stain thereon, and strikes deeply therein.

Being entirely free of acid properties or other injurious elements, the leather will in no way suffer either in strength or texture from its application, and as the liquid sinks deeply into the leather the stain which it imparts thereto will be utterly ineradicable from the wearing or rubbing off of its outer surface.

It will be applied to the leather with a brush, and dries rapidly, and, when dry, presents a bronzed appearance, which will be converted into a deep black by the application of water with a cloth or sponge.

I may use this staining material in connection with other organic substances than leather; but it is chiefly intended to be employed on the latter for the concealment of defective places in the blackened surface of the same.

After application the leather may then be dressed with liquid blacking or paste, or such materials as are commonly used, and in this event I dispense with applying the water, which then becomes superfluous, as the bronzed appearance will be displaced upon the application of such dressing.

Its effect will be the same on every description of leather; but in classes of leather having a very close grain, such as pebble goods and those qualities used in the manufacture of pocket-books, two coats of the compound will be applied, the one upon the other, in order to obtain the desired intense black.

The yellow and blue anilines, by their union, form a green, which, by the addition of the napthaline, is converted into a very deep green, so that, by the addition of red, it will produce a black. Of itself the mixture of the yellow and blue anilines would produce a light green of insufficient depth when mixed with the red to produce a deep black.

I am aware that a black dressing for leather has been made with shellac, ammonia, and aniline-blue; hence I do not claim such invention.

What I claim as new, and desire to secure by Letters Patent, is—

The black leather stain compounded of blue aniline, yellow aniline, red aniline, naphthaline, and alcohol, combined in or about the proportions substantially as specified.

In testimony that I claim the above I have hereunto subscribed my name in the presence of two witnesses.

GEORGE S. WOLFF.

Witnesses:
ALLEN H. GANGEWER,
GEO. C. SHELMERDINE.